Patented Nov. 7, 1922.

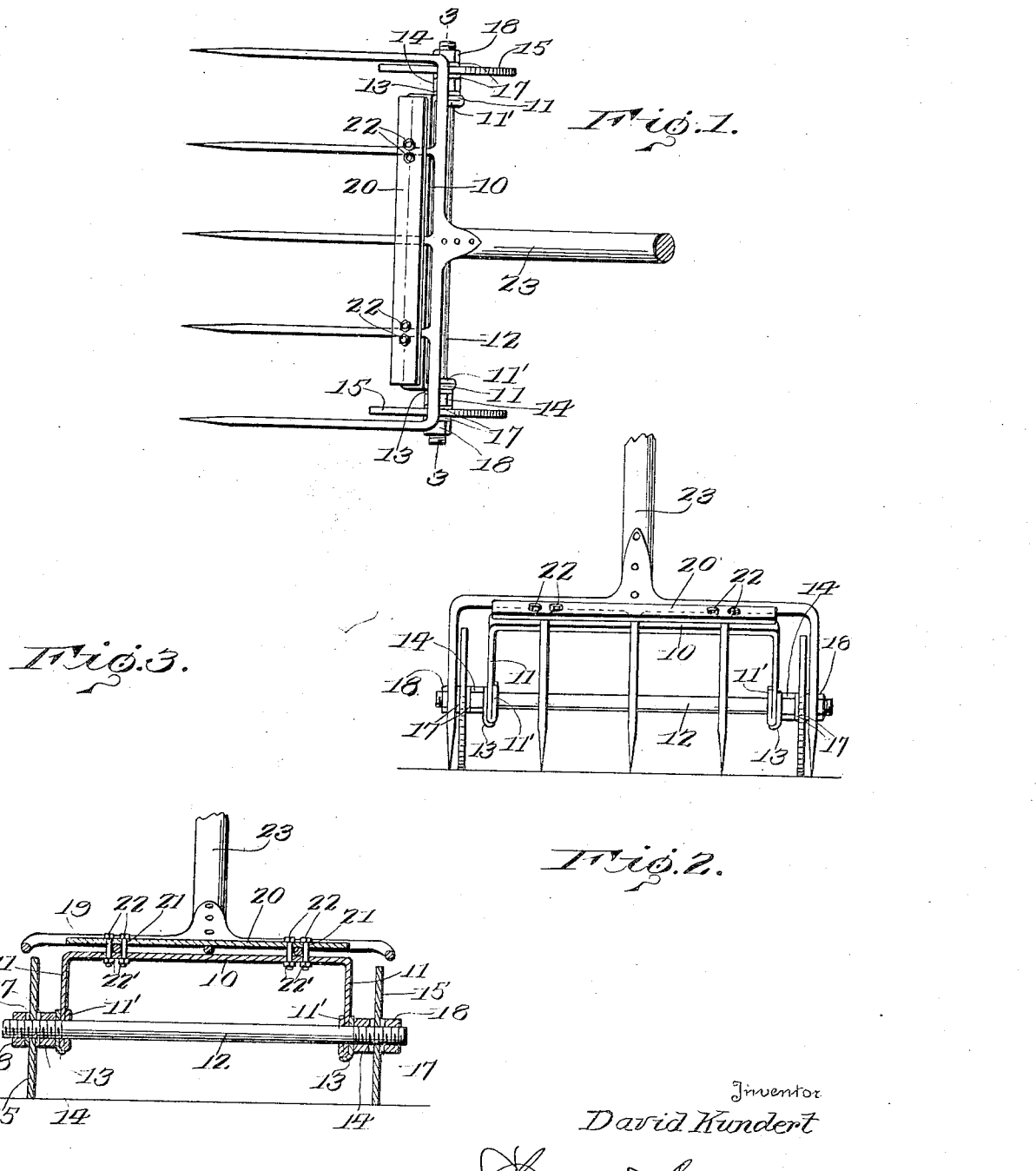

1,434,828

UNITED STATES PATENT OFFICE.

DAVID KUNDERT, OF NEW GLARUS, WISCONSIN.

MANURE-FORK ATTACHMENT.

Application filed November 7, 1921. Serial No. 513,414.

*To all whom it may concern:*

Be it known that I, DAVID KUNDERT, a citizen of the United States, residing at New Glarus, in the county of Green, State of Wisconsin, have invented certain new and useful Improvements in Manure-Fork Attachments; and I do hereby declare the following to be a full, clear, and exact description of the invention, such as will enable others skilled in the art to which it appertains to make and use the same.

This invention relates to new and useful improvements in manure forks and particularly to attachments therefor.

One object of the invention is to provide a wheeled support for a manure fork which will permit the easy movement of the fork when cleaning a stable.

Another object is to provide a device of this character which can be easily and quickly applied to any manure fork without modifications to the fork.

Other objects and advantages will be apparent from the following description when taken in connection with the accompanying drawing.

In the drawing:

Figure 1 is a top plan view of a manure fork equipped with the invention.

Figure 2 is a front elevation of the same.

Figure 3 is a vertical transverse sectional view taken on the line 3—3 of Figure 1, which passes longitudinally and centrally through the arched axle support.

Referring particularly to the accompanying drawing, 10 represents an inverted angular U-shaped member having the lower ends of the depending arms 11, doubled and turned upwardly, as shown at 11', said portions being apertured for the reception of the ends of the axle 12. Engaged on the ends of the axle 12, and lying against the outer faces of the arms 11, are the plates 13, the lower ends of which partially embrace the lower ends of the arms 11. The ends of the axle 12 are threaded, and engaged on each end of the axle, and bearing against a plate 13, is a nut 14. Rotatably supported on the outer ends of the axle, outwardly of the arms 11, are the ground engaging wheels 15, and on the axle, at each side of each wheel, is a split spring washer 17, while a nut 18 is engaged on the axle, outwardly of each of the outer washers 17. The nuts 14 and 18 are turned tightly against the spring washers 17, so that the wheels are firmly clamped therebetween, the axle 12 rotating freely within the openings in the arms 11.

Formed through the transverse portion of the yoke 10, at each side of the center thereof, is a pair of longitudinally alined openings 19, and disposed above this portion of the yoke is a longitudinally extending plate 20, said plate being also formed with similar openings 21, which register with those of the yoke, for the reception of the clamping bolts 22. The tines of the fork 23 are slipped between the transverse portion of the yoke and the plate 20, in such manner that two of the tines, those intermediate the sides of the fork, lie between a pair of bolts 22. When the nuts 22', of the bolts 22, are screwed home, the tines of the fork will be tightly clamped between the yoke and the plate, it being understood that the fork is slipped between the yoke and plate until the transversely extending portion of the head of the fork abuts the yoke and plate. The tines thus project forwardly from the yoke. By grasping the handle of the fork and lowering the tines to the floor, the operator may push the fork forwardly beneath the manure, while the fork is supported on the wheels 16, and then, by rocking the fork and yoke on the axle, the tines will be lifted to elevate the load. The fork, in this elevated position, may then be pushed to the desired location, where the load may be dumped.

What is claimed is:

The combination with a manure fork, of a carriage therefor comprising a yoke, an axle rotatably supported in the yoke, plates on the axle and disposed against the arms of the yoke, ground wheels on the ends of the axle, split washers on the axle at opposite sides of each wheel, nuts on the ends of the axle and engaged against the said washers, and a plate detachably secured on the transverse portion of the yoke for cooperation with said portion of the yoke to clamp the tines of the fork therebetween.

In testimony whereof, I affix my signature, in the presence of two witnesses.

DAVID KUNDERT.

Witnesses:
 EMANUEL STREIFF,
 S. A. SCHINDLER.